(12) United States Patent
Sealey, II et al.

(10) Patent No.: US 11,118,311 B2
(45) Date of Patent: Sep. 14, 2021

(54) HEAT RECOVERY FROM VACUUM BLOWERS ON A PAPER MACHINE

(71) Applicant: STRUCTURED I, LLC, Great Neck, NY (US)

(72) Inventors: James E. Sealey, II, Belton, SC (US); Byrd Tyler Miller, IV, Easley, SC (US)

(73) Assignee: STRUCTURED I, LLC, Great Neck, NY (US)

(*) Notice: Subject to any disclaimer, the term of this patent is extended or adjusted under 35 U.S.C. 154(b) by 28 days.

(21) Appl. No.: 16/684,848

(22) Filed: Nov. 15, 2019

(65) Prior Publication Data

US 2020/0190738 A1 Jun. 18, 2020

Related U.S. Application Data

(60) Provisional application No. 62/769,867, filed on Nov. 20, 2018.

(51) Int. Cl.
| | |
|---|---|
| *D21F 5/14* | (2006.01) |
| *D21F 5/20* | (2006.01) |
| *F26B 5/04* | (2006.01) |
| *F26B 21/10* | (2006.01) |
| *F26B 21/08* | (2006.01) |

(52) U.S. Cl.
CPC .......... *D21F 5/14* (2013.01); *D21F 5/20* (2013.01); *F26B 5/047* (2013.01); *F26B 21/08* (2013.01); *F26B 21/10* (2013.01)

(58) Field of Classification Search
CPC .... D21F 5/14; D21F 5/20; F26B 5/047; F26B 21/08; F26B 21/10

USPC ......................................................... 34/444
See application file for complete search history.

(56) References Cited

U.S. PATENT DOCUMENTS

| | | | | |
|---|---|---|---|---|
| 1,595,238 | A | * | 8/1926 | Minton ................. D21F 5/14 34/452 |
| 3,208,158 | A | * | 9/1965 | Smith, Jr. ............ D21G 9/0036 34/122 |
| 3,295,842 | A | * | 1/1967 | Stelling, Jr. ............ F26B 21/10 432/50 |
| 5,974,691 | A | * | 11/1999 | Marchal ................ D21F 5/20 34/122 |
| 6,869,506 | B2 | * | 3/2005 | Jewitt ................... D21F 5/20 162/189 |
| 7,150,111 | B2 | * | 12/2006 | Viljanmaa ............ D21F 5/20 34/446 |

(Continued)

FOREIGN PATENT DOCUMENTS

| | | | | |
|---|---|---|---|---|
| CA | 2506612 | A1 * | 6/2004 | ............... D21F 5/20 |
| DE | 102007006960 | A1 * | 8/2008 | ............... D21F 5/20 |

(Continued)

*Primary Examiner* — Stephen M Gravini
(74) *Attorney, Agent, or Firm* — Amster, Rothstein & Ebenstein LLP

(57) ABSTRACT

A papermaking process including the steps of forming a wet paper web on a papermaking machine, pulling vacuum through the web to remove water from the web and thereby generate discharge air, and diverting at least a portion of the discharge air through a control loop to a hot air drying system within the papermaking process to aid in drying the web, wherein the vacuum is generated by centrifugal blowers.

9 Claims, 2 Drawing Sheets

(56) References Cited

U.S. PATENT DOCUMENTS

| | | | |
|---|---|---|---|
| 8,196,314 B2 * | 6/2012 | Munch | D21F 5/182 |
| | | | 34/618 |
| 10,815,620 B2 * | 10/2020 | Sealey | B32B 5/26 |
| 2020/0033059 A1 * | 1/2020 | Bohn | F26B 13/30 |
| 2020/0190738 A1 * | 6/2020 | Sealey, II | F26B 21/04 |
| 2020/0309453 A1 * | 10/2020 | Puckett | F26B 11/028 |
| 2020/0370830 A1 * | 11/2020 | Purdon | F26B 3/04 |
| 2021/0032813 A1 * | 2/2021 | Sealey, II | D21F 11/006 |

FOREIGN PATENT DOCUMENTS

| | | | | |
|---|---|---|---|---|
| EP | 1959053 A1 * | 8/2008 | | D21F 5/20 |
| JP | 4275626 B2 * | 6/2009 | | D21F 5/20 |
| WO | WO-2004048685 A1 * | 6/2004 | | D21F 5/181 |

\* cited by examiner

HEAT RECOVERY FROM VACUUM BLOWERS ON A PAPER MACHINE

RELATED APPLICATIONS

This application claims priority to and the benefit of U.S. Provisional Application No. 62/769,867, filed Nov. 20, 2018 and entitled HEAT RECOVERY FROM VACUUM BLOWERS ON A PAPER MACHINE, the contents of which are incorporated herein by reference.

FIELD OF THE INVENTION

The present invention relates to a an improved process for making paper, and in particular is directed to a papermaking process that involves application of vacuum to a wet web and hot air drying of the web.

BACKGROUND

Tissue manufacturers that can deliver the highest quality product at the lowest cost have a competitive advantage in the marketplace. A key component in determining the cost and quality of a tissue product is the manufacturing process utilized to create the product. For tissue products, there are several manufacturing processes available including conventional dry crepe, through air drying ("TAD"), or "hybrid" technologies such as Valmet's NTT and QRT processes, Georgia Pacific's ETAD, and Voith's ATMOS process. Each has distinctive differences in regards to installed capital cost, raw material utilization, energy cost, production rates, and the ability to generate desired quality attributes such as softness, strength, and absorbency. All of these distinctive differences need to be taken into account when choosing the proper process to make a tissue product.

The predominant manufacturing method for making a tissue web is the conventional dry crepe process. The process is the oldest tissue manufacturing process and is thus well understood and optimized for high production rates. The major steps of the conventional dry crepe process involve stock preparation, forming, pressing, drying, creping, calendering (optional), and reeling the web.

The first step of stock preparation involves selection, blending, mixing, and preparation of the proper ratio of wood, plant, or synthetic fibers along with chemistry and fillers that are needed in the specific tissue grade. This mixture is diluted to over 99% water in order to allow for even fiber formation when deposited from the machine headbox into the forming section. There are many types of forming sections used in conventional papermaking (examples include inclined suction breast roll, twin wire C-wrap, twin wire S-wrap, suction forming roll, and Crescent formers) but all are designed to retain the fiber, chemical, and filler recipe while allowing the water to drain from the web.

After web formation and drainage (to around 35% solids) in the forming section (assisted by centripetal force around the forming roll, and vacuum boxes in several former types), the web is transferred to a press fabric upon which the web is pressed between a rubber or polyurethane covered suction pressure roll and yankee dryer. The press fabric is a permeable fabric designed to uptake water from the web as it is pressed in the press section. It is composed of large monofilaments or multi-filamentous yarns, needled with fine synthetic batt fibers to form a smooth surface for even web pressing against the yankee dryer. Removing water via pressing results in low energy consumption.

After pressing the sheet between a suction pressure roll and a steam heated cylinder (referred to as a yankee dryer), the web is dried from up to 50% solids to up to 99% solids using the steam heated cylinder and hot air impingement from an air system (air cap or hood) installed over the steam cylinder. The sheet is then creped from the steam cylinder using a steel or ceramic doctor blade. This is a critical step in the conventional dry crepe process. The creping process greatly affects softness as the surface topography is dominated by the number and coarseness of the crepe bars (finer crepe is much smoother than coarse crepe). Some thickness and flexibility is also generated during the creping process. If the process is a wet crepe process, the web must be conveyed between dryer fabrics through steam heated after-dryer cans to dry the web to the required finished moisture content. After creping, the web is optionally calendered and reeled into a parent roll and ready for the converting process.

The absorbency of a conventional tissue web is low due to the web being pressed. This results in a low bulk, low void volume web where there is little space for water to be absorbed. Additionally, bulk generated by creping is lost when the web is wetted, which further reduces bulk and void volume.

The through air dried (TAD) process is another manufacturing method for making a tissue web. The major steps of the through air dried process are stock preparation, forming, imprinting, thermal pre-drying, drying, creping, calendering (optional), and reeling the web. The stock preparation and forming steps are similar to conventional dry creping.

Rather than pressing and compacting the web, as is performed in conventional dry crepe, the web undergoes the steps of imprinting and thermal pre-drying. Imprinting is a step in the process where the web is transferred from a forming fabric to a structured fabric (or imprinting fabric) and subsequently pulled into the structured fabric using vacuum (referred to as imprinting or molding). This step imprints the weave pattern (or knuckle pattern) of the structured fabric into the web. This imprinting step has a tremendous effect on the softness of the web, both affecting smoothness and the bulk structure. The design parameters of the structured fabric (including, for example, weave pattern, mesh, count, warp and weft monofilament diameters, caliper, air permeability, and optional over-laid polymer) are therefore critical to the development of web softness. The manufacturing method of an imprinting fabric is similar to a forming fabric (see U.S. Pat. Nos. 3,473,576, 3,573,164, 3,905,863, 3,974,025, and 4,191,609 for examples) except for the addition of an overlaid polymer. These types of fabrics are disclosed in U.S. Pat. Nos. 5,679,222, 4,514,345, 5,334,289, 4,528,239 and 4,637,859, for example. Essentially, fabrics produced using these methods result in a fabric with a patterned resin applied over a woven substrate. The benefit is that resulting patterns are not limited by a woven structure and can be created in any desired shape to enable a higher level of control of the web structure and topography that dictate web quality properties.

After imprinting, the web is thermally pre-dried by moving hot air through the web while it is conveyed on the structured fabric. Thermal pre-drying can be used to dry the web to over 90% solids before it is transferred to a steam heated cylinder. The web is then transferred from the structured fabric to the steam heated cylinder through a very low intensity nip (up to 10 times less than a conventional press nip) between a solid pressure roll and the steam heated cylinder. The only portions of the web that are pressed between the pressure roll and the steam cylinder rest on knuckles of the structured fabric; thereby protecting most of the web from the light compaction that occurs in this nip. The steam cylinder and an optional air cap system, for impinging hot air, then dry the sheet to up to 99% solids during the drying stage before creping occurs. The creping step of the process again only affects the knuckle sections of the web that are in contact with the steam cylinder surface. Due to only the knuckles of the web being creped, along with the dominant surface topography being generated by the structured fabric, and the higher thickness of the TAD web, the creping process has a much smaller effect on the overall softness properties compared to conventional dry crepe. After creping, the web is optionally calendered and reeled into a parent roll and ready for the converting process. Some TAD machines utilize fabrics (similar to dryer fabrics) to support the sheet from the crepe blade to the reel drum to aid in sheet stability and productivity. Patents which describe creped through air dried products include, for example, U.S. Pat. Nos. 3,994,771, 4,102,737, 4,529,480, and 5,510,002.

The TAD process is generally higher in capital costs than a conventional tissue machine due to the amount of air handling equipment needed for the TAD section, with higher energy consumption due to the need to burn natural gas or other fuels for thermal pre-drying. The bulk softness and absorbency is superior to conventional paper due to the superior bulk generation via structured fabrics which creates a low density, high void volume web that retains its bulk when wetted. The surface smoothness of a TAD web can approach that of a conventional tissue web. The productivity of a TAD machine is less than that of a conventional tissue machine due to the complexity of the process and especially the difficulty in providing a robust and stable coating package on the yankee dryer needed for transfer and creping of a delicate pre-dried web.

A variation of the TAD process where the sheet is not creped, but rather dried to up to 99% using thermal drying and blown off the structured fabric (using air) to be optionally calendered and reeled also exits. This process is called UCTAD or un-creped through air drying process. An uncreped through air dried product is disclosed in U.S. Pat. No. 5,607,551.

A new process/method and paper machine system for producing tissue has been developed by the Voith company and is being marketed under the name ATMOS. The process/method and paper machine system has several patented variations, but all involve the use of a structured fabric in conjunction with a belt press. The major steps of the ATMOS process and its variations are stock preparation, forming, imprinting, pressing (using a belt press), creping, calendering (optional), and reeling the web.

The stock preparation step is the same as that used in a conventional or TAD machine. The purpose is to prepare the proper recipe of fibers, chemical polymers, and additives that are necessary for the grade of tissue being produced, and diluting this slurry to allow for proper web formation when deposited out of the machine headbox (single, double, or triple layered) to the forming surface. The forming process can utilize a twin wire former (as described in U.S. Pat. No. 7,744,726) a Crescent Former with a suction Forming Roll (as described in U.S. Pat. No. 6,821,391), or preferably a Crescent Former (as described in U.S. Pat. No. 7,387,706). The preferred former is provided with a slurry from the headbox to a nip formed by a structured fabric (inner position/in contact with the forming roll) and forming fabric (outer position). The fibers from the slurry are predominately collected in the valleys (or pockets, pillows) of the structured fabric and the web is dewatered through the forming fabric. This method for forming the web results in a unique bulk structure and surface topography as described in, for example, U.S. Pat. No. 7,387,706 (FIG. 1 through FIG. 11). The fabrics separate after the forming roll with the web staying in contact with the structured fabric. At this stage, the web is already imprinted by the structured fabric, but utilization of a vacuum box on the inside of the structured fabric can facilitate further fiber penetration into the structured fabric and a deeper imprint.

The web is now transported on the structured fabric to a belt press. The belt press can have multiple configurations. Belt press configurations used in conjunction with a structured fabric can be viewed in U.S. Pat. No. 7,351,307 (FIG. 13), where the web is pressed against a dewatering fabric across a vacuum roll by an extended nip belt press. The press dewaters the web while protecting the areas of the sheet within the structured fabric valleys from compaction. Moisture is pressed out of the web, through the dewatering fabric, and into the vacuum roll. The press belt is permeable and allows for air to pass through the belt, web, and dewatering fabric, into the vacuum roll enhancing the moisture removal. Since both the belt and dewatering fabric are permeable, a hot air hood can be placed inside of the belt press to further enhance moisture removal as shown in FIG. 14 of U.S. Pat. No. 7,351,307. Alternately, the belt press can have a pressing device arranged within the belt which includes several press shoes, with individual actuators to control cross direction moisture profile, (see FIG. 28 in U.S. Pat. Nos. 7,951,269 8,118,979 or FIG. 20 of U.S. Pat. No. 8,440,055) or a press roll (see FIG. 29 in U.S. Pat. No. 7,951,269 or U.S. Pat. No.8,118,979 or FIG. 21 of U.S. Pat. No. 8,440,055). The preferred arrangement of the belt press has the web pressed against a permeable dewatering fabric across a vacuum roll by a permeable extended nip belt press. Inside the belt press is a hot air hood that includes a steam shower to enhance moisture removal. The hot air hood apparatus over the belt press can be made more energy efficient by reusing a portion of heated exhaust air from the yankee air cap or recirculating a portion of the exhaust air from the hot air apparatus itself (see U.S. Pat. No. 8,196,314). Further embodiments of the drying system composed of the hot air apparatus and steam shower in the belt press section are described in U.S. Pat. Nos. 8,402,673, 8,435,384 and 8,544,184.

After the belt press is a second press to nip the web between the structured fabric and dewatering felt by one hard and one soft roll. The press roll under the dewatering fabric can be supplied with vacuum to further assist water removal. This preferred belt press arrangement is described in U.S. Pat. Nos. 8,382,956, and 8,580,083, with FIG. 1 showing the arrangement. Rather than sending the web through a second press after the belt press, the web can travel through a boost dryer (FIG. 15 of U.S. Pat. Nos. 7,387,706 or 7,351,307), a high pressure through air dryer (FIG. 16 of U.S. Pat. Nos. 7,387,706 or 7,351,307), a two pass high pressure through air dryer (FIG. 17 of U.S. Pat. Nos. 7,387,706 or #7,351,307) or a vacuum box with a hot air supply hood (FIG. 2 of U.S. Pat. No. 7,476,293). U.S. Pat. Nos. 7,510,631, 7,686,923, 7,931,781 8,075,739, and 8,092, 652 further describe methods and systems for using a belt press and structured fabric to make tissue products each having variations in fabric designs, nip pressures, dwell times, etc. and are mentioned here for reference. A wire turning roll can be also be utilized with vacuum before the sheet is transferred to a steam heated cylinder via a pressure roll nip (see FIG. 2a of U.S. Pat. No. 7,476,293).

The sheet is now transferred to a steam heated cylinder via a press element. The press element can be a through drilled (bored) pressure roll (FIG. 8 of U.S. Pat. 8,303,773), a through drilled (bored) and blind drilled (blind bored) pressure roll (FIG. 9 of U.S. Pat. No. 8,303,773), or a shoe press (see U.S. Pat. No. 7,905,989). After the web leaves this press element to the steam heated cylinder, the % solids are in the range of 40-50%. The steam heated cylinder is coated with chemistry to aid in sticking the sheet to the cylinder at the press element nip and also aid in removal of the sheet at the doctor blade. The sheet is dried to up to 99% solids by the steam heated cylinder and installed hot air impingement hood over the cylinder. This drying process, the coating of the cylinder with chemistry, and the removal of the web with doctoring is explained in U.S. Pat. Nos. 7,582,187 and 7,905,989. The doctoring of the sheet off the yankee, creping, is similar to that of TAD with only the knuckle sections of the web being creped. Thus the dominant surface topography is generated by the structured fabric, with the creping process having a much smaller effect on overall softness as compared to conventional dry crepe. The web is now calendered (optional) slit, and reeled and ready for the converting process.

The ATMOS process has capital costs between that of a conventional tissue machine and TAD machine. It has more fabrics and a complex drying system compared to a conventional machine, but less equipment than a TAD machine. The energy costs are also between that of a conventional and TAD machine due to the energy efficient hot air hood and belt press.

The productivity of the ATMOS machine may be limited due to the ability of the novel belt press and hood to dewater the web and web transfer to the yankee dryer, likely driven by supported coating packages, the inability of the process to utilize structured fabric release chemistry, and the inability to utilize overlaid fabrics to increase web contact area to the dryer. Adhesion of the web to the yankee dryer has resulted in creping and stretch development which may contribute to sheet handling issues in the reel section. The result is that the production of an ATMOS machine may be below that of a conventional and TAD machine.

The bulk softness and absorbency of the ATMOS process is superior to conventional, but lower than a TAD web since some compaction of the sheet occurs within the belt press, especially areas of the web not protected within the pockets of the fabric. Bulk may be limited since there is no speed differential to help drive the web into the structured fabric as exists on a TAD machine.

The surface smoothness of an ATMOS web may be between that of a TAD web and conventional web. With use of an overlaid fabric, higher contact area to the yankee dryer could be obtained resulting in finer crepe and a smoother surface.

The ATMOS manufacturing technique is often described as a hybrid technology because it utilizes a structured fabric like the TAD process, but also utilizes energy efficient means to dewater the sheet like the Conventional Dry Crepe process. Other manufacturing techniques which employ the use of a structured fabric along with an energy efficient dewatering process are the ETAD process and NTT process.

The ETAD process and products can be viewed in U.S. Pat. Nos. 7,339,378, 7,442,278, and 7,494,563. This process can utilize any type of former such as a Twin Wire Former or Crescent Former. After formation and initial drainage in the forming section, the web is transferred to a press fabric where it is conveyed across a suction vacuum roll for water removal, increasing web solids up to 25%. The web then travels into a nip formed by a shoe press and backing/transfer roll for further water removal, increasing web solids up to 50%. At this nip, the web is transferred onto the transfer roll and then onto a structured fabric via a nip formed by the transfer roll and a creping roll. At this transfer point, speed differential can be utilized to facilitate fiber penetration into the structured fabric and build web caliper. The web then travels across a molding box to further enhance fiber penetration if needed. The web is then transferred to a yankee dryer where it can be optionally dried with a hot air impingement hood, creped, calendared, and reeled.

The ETAD process to date has been reported to have severe productivity, quality, and cost problems. Poor energy efficiency has been reported, bulk has been difficult to generate (likely due to high web dryness at the point of transfer to the structured fabric), and softness has been poor (coarse fabrics have been utilized to generate target bulk, thereby decreasing surface smoothness). Absorbency is better than ATMOS due to the ability to utilize speed differential to build higher bulk, but it is still below that of TAD which can create higher bulk with limited web compaction that reduces void volume and thus absorbency. The installed costs of an ETAD machine are unknown but likely close to that of a TAD machine due to the large amount of fabrics and necessary supporting equipment.

The NTT process and products can be viewed in international patent application publication WO 2009/061079 A1, US 2011/0180223 A1, and US 2010/0065234 A1. The process has several embodiments, but the key step is the pressing of the web in a nip formed between a structured fabric and press felt. The web contacting surface of the structured fabric is a non-woven material with a three dimensional structured surface comprised of elevations and depressions of a predetermined size and depth. As the web is passed through this nip, the web is formed into the depression of the structured fabric since the press fabric is flexible and will reach down into all of the depressions during the pressing process. When the felt reaches the bottom of the depression, hydraulic force is built up which forces water from the web and into the press felt. To limit compaction of the web, the press rolls will have a long nip width which can be accomplished if one of the rolls is a shoe press. After pressing, the web travels with the structured fabric to a nip with the yankee dryer, where the sheet is optionally dried with a hot air impingement hood, creped, calendared, and reeled.

The NTT process has low capital costs, equal or slightly higher than a conventional tissue machine. It has high production rates (equal or slightly less than a conventional machine) due to the simplicity of design, the high degree of dewatering of the web at the shoe press, and the novelty of construction of the structured fabric. The structured fabric, provides a smooth surface with high contact area to the dryer for efficient web transfer. This high contact area and smooth surface makes the yankee coating package much easier to manage and creates conditions beneficial for fine creping, resulting in good sheet handling in the reel section. The bulk softness of the NTT web is not equal to the ATMOS sheet as the web is highly compacted inside the structured fabric by the press felt compared to the ATMOS web. The surface smoothness is better than an ATMOS web due to the structured fabric design providing for better creping conditions. The NTT process also does not have a speed differential into the structured fabric so the bulk and absorbency remains below the potential of the TAD and ETAD processes.

The QRT process can be viewed in U.S. Patent Application Publication No. 2008/0156450 A1 and U.S. Pat. No. 7,811,418. The process can utilize a twin wire former to form the web which is then transferred to a press fabric or directly formed onto a press fabric using an inverted Crescent former. The web can be dewatered across a suction turning roll in the press section before being pressed in an extended nip between the press fabric and a plain transfer belt. A rush transfer nip is utilized to transfer the web to a structured fabric in order to build bulk and mold the web before the web is transferred to the yankee dryer and creped. This process alleviates the NTT design deficiency which lacks a rush transfer or speed differential to force the web into the structured fabric to build bulk. However, the costs, complexity, and likely productivity will be negatively affected.

As detailed, all of the above described tissue papermaking processes utilize vacuum somewhere in the process to remove water from the web. For example, in the conventional dry and wet creped tissue process, vacuum is utilized to remove water from the web using a suction pressure roll at the nip to the steam heated cylinder. In the TAD and UCTAD processes, vacuum is utilized in the imprinting stage to pull the sheet into the imprinting fabric as well as at various locations in the forming section to dewater the nascent web. The ATMOS process utilizes vacuum inside the vacuum roll across which the web inside the structuring fabric is dewatertered between a press felt and belt press. Vacuum is also utilized on the ATMOS machine at the suction pressure roll that is nipped to the steam heated cylinder. In the ETAD process, after formation and initial drainage in the forming section, the web is transferred to a press fabric where it is conveyed across a suction vacuum roll for water removal. The NTT process has several embodiments, but all utilize vacuum. For example, in FIG. 1 of U.S. Patent 2010/0065234 A1, which is the typical machine configuration, a steam box (26) is utilized across a suction roll (25) to remove water from the nascent web prior to being imprinted by pressing between a press fabric and imprinting fabric in an extended nip press. In the QRT process, the web can be dewatered across a suction turning roll in the press section before being pressed in an extended nip between the press fabric and a plain transfer belt. Additionally, each machine uses vacuum to remove contaminants from the various papermaking fabrics.

All the vacuum needs for the papermaking machine/process are centralized using vacuum pumps connected to a central or common piping header. From this header, branch piping extends to the necessary points of application and each branch can be controlled to a particular vacuum setpoint using a control scheme which is typically a control loop using a pressure indicating controller to measure the vacuum in the header and position a control valve to maintain an operator inputted vacuum setpoint for that header. There are two main types of vacuum pumps that can be utilized to generate the necessary vacuum level efficiency in a large papermaking process; liquid ring vacuum pumps and centrifugal blowers.

Typically, the vacuum pump of choice for paper machine vacuum systems have been liquid ring pumps due to efficiencies and the ability to generate the very high vacuum capacities necessary in the papermaking process. Liquid ring vacuum pumps are a specific form of rotary positive displacement pump utilizing liquid as the principal element in gas compression. In the case of the liquid ring pumps used in the papermaking processes, the liquid used is water and the gas being compressed is air. The compression is performed by a ring of liquid formed as a result of the relative eccentricity between the pumps' casing and a rotating multi-bladed impeller. The eccentricity results in near complete filling and then partial emptying of each rotor chamber during every revolution. The filling and emptying action creates a piston action within each set of rotors of impeller blades. The pumps' components are positioned in such a manner as to admit gas when the rotor chamber is emptying the liquid and then allowing the gas to discharge once compression is completed. The compression of gas generates significant heat through friction as the air molecules are being forced into closer contact. This heat is transferred into the liquid used in the vacuum pump. To prevent overheating, the liquid must be continually removed, cooled, and returned to the pump. Typically, the liquid is cooled using a cooling tower which simply transfers the waste heat in the liquid to the atmosphere. Alternately, a liquid to liquid or liquid to air heat exchanger could be utilized to recover some of the thermal energy to be used elsewhere in the papermaking process.

Centrifugal blowers do not utilize liquid to compress the gas. The gas enters at the center of a set of spinning impellers, and is divided between the impeller's vanes. As the impeller turns, it accelerates the air outwards using centrifugal force. This high-velocity air is then diffused and slowed down in the surrounding blower housing to create vacuum. The compression of air through centripetal force can heat the air to excess of 160 deg C. This air is sometimes passed through an air to air or air to liquid heat exchanger to recover some of the thermal energy and used elsewhere in the papermaking process. All the vacuum systems described above contain separators to remove entrained water in the air stream between the vacuum source (pump) and application point.

Although each of the papermaking processes provide advantages in web production and desired web characteristics, there is a continuing need for more efficient papermaking processes.

SUMMARY OF THE INVENTION

As detailed above, each of the tissue papermaking processes also uses a drying step where hot air is impinged onto the nascent web or drawn through the nascent web to remove water. All the tissue papermaking processes except the UCTAD process utilize a hot air impingement system to dry the web as it travels across a steam heated cylinder. The TAD and UCTAD processes utilize thermal drying by moving hot air through the nascent web as it travels on a structuring fabric across a hollow through air drying cylinder. The ATMOS process can utilize thermal drying by moving hot air through the nascent web into a vacuum roll as it travels on a structuring fabric across the belt press.

An object of the present invention is to improve the efficiency of a papermaking process that uses vacuum to remove water from a paper web and hot air drying for drying of the web, by using at least a portion of the discharge air generated by the vacuum for the hot air drying of the web.

The present invention provides improved processes for papermaking including: forming a wet paper web on a papermaking machine selected from the group consisting of a through air drying machine and a hybrid tissue machine; pulling vacuum through the web to remove water from the web and thereby generate discharge air; and diverting a portion of the discharge air to hot air drying areas within the papermaking process to aid in drying the web, wherein the vacuum is generated by centrifugal blowers.

A papermaking process according to an exemplary embodiment of the present invention comprises: forming a wet paper web on a papermaking machine; pulling vacuum through the web to remove water from the web and thereby generate discharge air; and diverting at least a portion of the discharge air through a control loop to a hot air drying system within the papermaking process to aid in drying the web, wherein the vacuum is generated by centrifugal blowers.

In an exemplary embodiment, the process further comprises the step of controlling humidity of hot air within the hot air drying system.

In an exemplary embodiment, the step of controlling humidity comprises: detecting humidity of the hot air within the control loop; and controlling speed of an exhaust fan within the hot air drying system based on the detected humidity so as to adjust the humidity of the hot air to a predetermined level.

In an exemplary embodiment, the step of controlling humidity further comprises controlling position of a fresh air damper within the control loop based on the detected humidity.

In an exemplary embodiment, the process further comprises the step of controlling pressure of the discharge air diverted to the hot air drying system.

In an exemplary embodiment, the step of controlling pressure comprises: detecting pressure of the discharge air; and controlling position of a damper within the control loop based on the detected pressure so as to adjust the pressure of the discharge air to a predetermined level.

In an exemplary embodiment, the process further comprises the step of controlling pressure of hot air within the hot air drying system.

In an exemplary embodiment, the step of controlling pressure of hot air comprises: detecting pressure around a hot air impingement hood within the hot air drying system; controlling position of a vacuum exhaust damper within the control loop based on the detected pressure so as to adjust the pressure of hot air to a predetermined level.

In an exemplary embodiment, the step of controlling pressure of hot air further comprises controlling speed of a discharge air supply fan based on the detected pressure.

DETAILED DESCRIPTION

Figure 1:
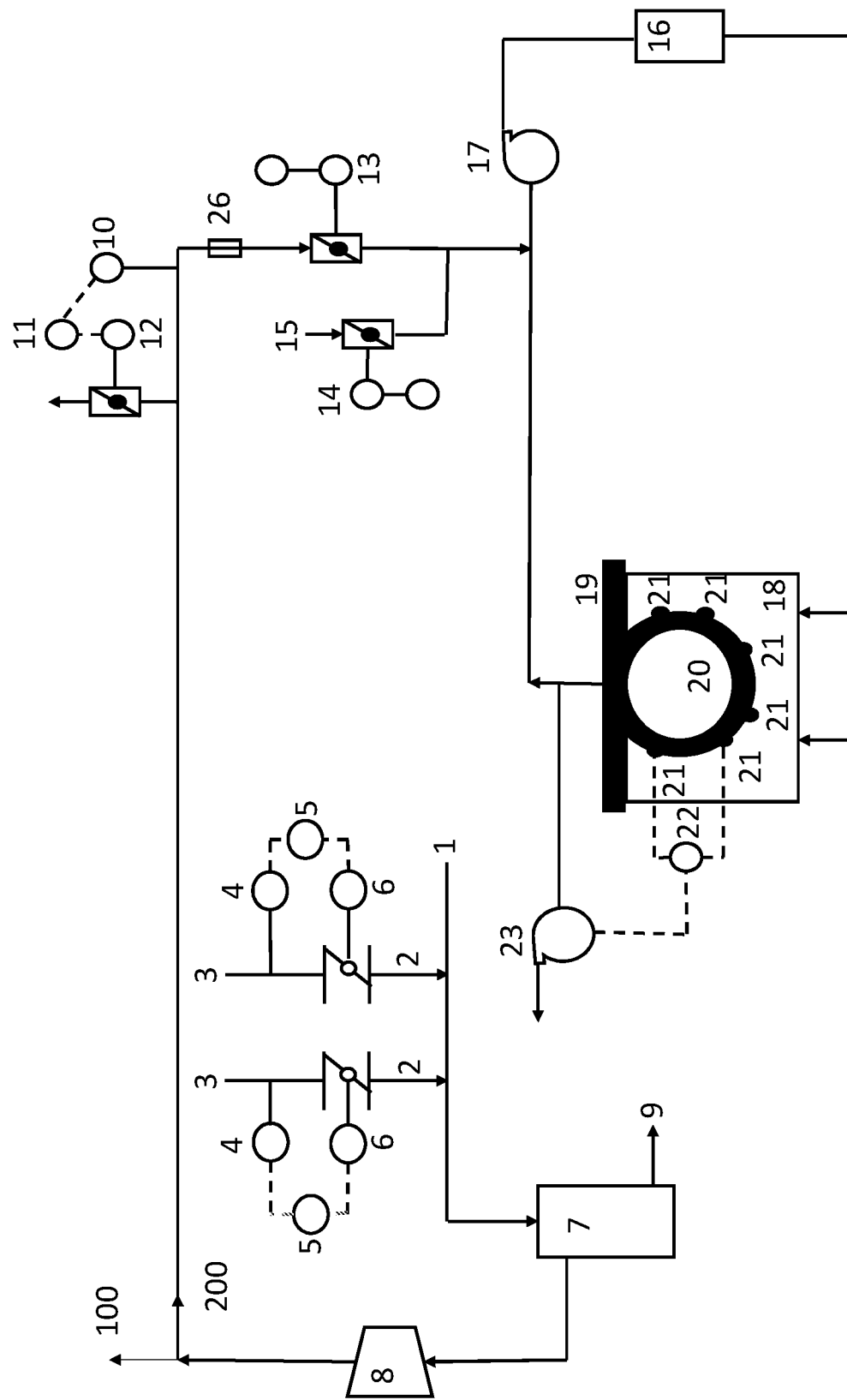
FIG. 1 is a schematic diagram of a control process according to an exemplary embodiment of the present invention.

The processes of the invention may result in significant energy savings that can be reaped by recovering the thermal energy in the discharge air stream created by the papermaking machine's vacuum system by using the hot discharge air as a direct source of make up air for the various thermal hot air drying processes that have been discussed for drying a nascent tissue web. This can be accomplished only when the vacuum system uses blowers and not liquid ring vacuum pumps as will be explained. Thus, the various exemplary embodiments of the present invention are applicable only to papermaking processes that involve the use of blowers as vacuum sources, and which do not include liquid ring vacuum pumps.

Because centrifugal vacuum pumps do not use liquid to compress air, the discharge air stream is relatively dry and able to evaporate additional water making it suitable for use in hot air drying systems. Because liquid ring vacuum pumps utilize water to compress the air, the discharge air is completely saturated and unable to evaporate any additional water thus making the air source unusable for any hot air drying systems. Centrifugal vacuum pumps provide a relatively dry discharge air stream that is suitable for use in hot air drying systems on paper machines which actually have improved heat transfer with moisture in the air up to 0.45 lb. of water per lb. of air.

To capture fully the waste heat from vacuum systems that use blowers, the discharged air from the blower could be directly used as makeup air to various thermal hot air drying processes that have been discussed for drying a nascent tissue web, rather than recovering a portion of the energy through a type of heat exchanger. All or a portion of the discharge air may be sent to the thermal hot air dryers to comprise makeup air. The amount of discharge air sent to the thermal hot air dryers may range from 10%, 20%, 30%, 40%, 50%, 60%, 70%, 80% or 90% to 100% of the discharge air. Conventional ducts may be attached to the point where vacuum air is discharged and run to the various hot air dryers forming a loop. Blowers may be utilized in line to facilitate flow of the discharge air to the hot air dryers. The loop may include moisture sensors. If the moisture gets too high, the air flow is increased. If the moisture gets too low, the air flow is decreased. Fast acting dampers may be included in the loop. Pressure sensors may also be included in the loop. If the pressure gets too high, the blowers may be shut down and/or the dampers may decrease the flow. The dampers may be opened or closed as needed, based on the pressure and moisture readings.

As previously explained, vacuum systems and hot air drying are used in all the tissue papermaking process. The discharge air from vacuum systems that use centrifugal blowers can recover some waste heat from the discharge air using heat exchangers, but a near complete heat recovery of the discharge air can be accomplished if the discharge air is used directly as a make-up air source for at least one of the hot air drying processes used to dry the nascent web on any of the mentioned papermaking machines/processes.

On any of the hot air drying systems, a fuel source is used to heat the air. Typically, the most economical fuel is natural gas. This heated air stream is pumped through the nascent web in one of the aforementioned drying processes where it will remove water from the web. This air stream is recirculated with some portion of the air being removed to maintain a level of humidity in the air that is optimal for heat transfer and thus removal of water from the nascent web. This level of humidity is roughly 0.45 lb. of water per lb. of dry air. Many factors affect the capacity and efficiency of a hot air stream to evaporate and remove water from a wet surface including temperature, pressure, and moisture content of the air stream.

By using a humidity sensor and control loop, input and control to theoretically optimal humidity (moisture content) can be achieved for heat transfer based on thermodynamic calculations at varying temperature and pressure conditions. The portion of air that is removed must be replaced with fresh air that could have been passed through an air to air heat exchanger to reduce the natural gas needed to heat the air to the necessary temperature setpoint. Rather than using fresh atmospheric air as the make-up source of air for the drying system, the inventive method uses the discharge air from the paper machine vacuum systems that use centrifugal blowers. The discharge temperature from a papermaking vacuum system using a centrifugal blower can be up to 160 deg C and the flow rate of the discharge air may be up to 2800 cubic meters/min.

This hot, relatively dry source of air reduces the natural gas that needs to be utilized to reheat the recirculated air up to a normal operating temperature of roughly 200 deg C for most hot air drying processes in the papermaking process.

The present invention also provides a control scheme that uses a two damper control. The discharge air stream from the vacuum system to the hot air drying system may contain a pressure indicating controller to position a fast acting damper or control valve to maintain an operator inputted pressure setpoint. This setpoint will control the amount of air that is used as makeup air in the hot air drying system along with the speed control of the supply fan that recirculates the air through the system, and the exhaust fan that removes a portion of the wet air after it has passed through and absorbed water from the nascent web. The exhaust fan speed can be controlled by a humidity indicating controller to maintain 0.45 lb water per lb. of air, while the supply fan speed can be controlled by differential pressure indicating controllers that may control the fan speed to maintain a differential pressure of air across the nascent web. A fast acting damper for purging to atmosphere may be located on the vacuum discharge air line during startup and shutdown conditions of the hot air heating system.

The vacuum blowers may be shut down before the TAD blowers. In the event that pressure builds up in the system, a rupture disc or weight lift door may be included in the loop. The rupture disc or weight lift door may be positioned before the TAD recirculation loop, but after exhaust of the blower.

The invention illustratively disclosed herein suitably may be practiced in the absence of any component, ingredient, or step which is not specifically disclosed herein. Several examples are set forth below to further illustrate the nature of the invention and the manner of carrying it out. However, the invention should not be considered as being limited to the details thereof. All patents discussed above are hereby incorporated by reference.

FIG. 1 shows a control scheme according to an exemplary embodiment of the present invention for utilization of the exhaust air from a paper machine centrifugal blower vacuum pumps into a paper machine Through Air Drying system. All the vacuum needs for the papermaking machine/process are centralized using vacuum pumps connected to a central or common piping header (1). From this header, branch piping (2) extends to the necessary points of application (3) and each branch can be controlled to a particular vacuum setpoint using a control scheme which is typically a control loop using a pressure transmitter (4) and pressure indicating controller (5) to measure the vacuum in the branch and position a control valve (6) to maintain an operator inputted vacuum set-point for that branch. The vacuum header contains a separator (7) to remove entrained water in the air stream between the vacuum source (vacuum blower 8) and application point. Water removed from the separator can be returned to the paper machine white water system (9).

The discharge air stream header leaving from the vacuum system can split into multiple branch lines (for example, two branch lines (100), (200) as shown in FIG. 1) to feed more than one hot air drying system. Although only branch line (200) is shown in FIG. 1, it should be appreciated that second branch line (100) will have the same controls and feed duplicate hot air drying systems. Each branch line to its hot air drying system may contain a pressure transmitter (10) and pressure indicating controller (11) to position a fast acting damper (12) or control valve (12) to maintain an operator inputted pressure set-point. This set-point will control the amount of pressure in the discharge air stream branch line by relieving pressure to atmosphere. The pressure set-point is recommended to be from 0.1 to 0.5 kpa in order to maintain slight pressure in the line as to not cause back pressure on the vacuum blower (8). Fast acting dampers (13 and 14) are used for purging to atmosphere during startup and shutdown conditions of the hot air drying system. The damper (13) on the discharge air stream would close for the purging and startup and shutdown conditions, while the second fast acting damper (14) would open to allow fresh air (15) into the air system to purge any remaining natural gas before firing the system's gas burner (16). During normal operating conditions, the fresh air damper (14) and vacuum exhaust damper (13) are controlled by an inputted set-point by the operator.

The vacuum system discharge air stream then enters the through air drying, hot air system upstream of the supply fan (17). The speed of the supply fan is controlled by an operator inputted set-point. The air is heated in the combustion chamber (16) before entering a hood (18) which extends over the paper web path (19) where the paper web is conveyed on a structuring fabric across a through air drying cylinder or drum (20). Along the perimeter of the hood on both the front and back side of the hood, there are located a series of pressure transmitters (21). These transmitters measure the pressure of air at the interface of the hood and drying cylinder along the perimeter where atmospheric air could be pulled through the gap that exists at the interface of the hood and drying cylinder. To ensure no cold atmospheric air is pulled through the gap into the air system, these transmitters relay the pressure data to a pressure indicating controller (22) which controls the speed of an exhaust fan (23) to maintain a pressure set-point entered by the operator. Typically, the pressure indicating controller will take the average reading of the pressure transmitters. The pressure set-point is generally 0.1 kpa which allows a slight amount of pressure and thus air to escape from the gap between the hood and the cylinder to prevent any cold air from atmosphere from entering the hot air system. After the hot air passes through the paper web and into the hollow cylinder, the air stream is recirculated back to the supply fan (17). A weighted lift door (25) may be installed on the vacuum discharge air stream piping between the two fast acting dampers. The purpose of this device is to safely relieve pressure in the event of failure of the fast acting dampers to control or relieve pressure in the line. The weighted lift door will lift or open prior to potential failure of the piping due to over-pressurization. It will also close after relieving the excess pressure. The weighted lift door is located on the piping in a location where any discharge air is relieved to atmosphere away from any possible personnel.

Example 1

Tissue paper was made on a wet-laid asset comprised of a twin wire gap forming section containing a three layer headbox, a predrying section containing two through air drying drums, a drying section containing a Yankee steam cylinder with a hot air imprignment hood, a reel belt for winding the paper towel web onto a spool, and a vacuum system containing vacuum blowers where the discharge air can be utilized as makeup air for the through air drying drums as explained above.

The tissue web was multilayered with the fiber and chemistry of each layer selected and prepared individually to maximize product quality attributes of softness and strength. The first exterior layer, which was the layer that contacted the Yankee dryer, was prepared using 80% eucalyptus with 0.25 kg/ton of the amphoteric starch and 0.25 kg/ton of the glyoxylated polyacrylamide. The interior layer was composed of 40% northern bleached softwood kraft fibers, 60% eucalyptus fibers, and 1.0 kg/ton of T526 a softener/debonder (EKA Chemicals Inc., 1775 West Oak Commons Court, Marietta, Ga., 30062). The second exterior layer was composed of 20% northern bleached softwood kraft fibers, 80% eucalyptus fibers and 3.0 kg/ton of Redibond 2038. Softwood was refined at 115 kwh/ton to impart the necessary tensile strength.

The fiber and chemicals mixtures were diluted to a solids of 0.5% consistency and fed to separate fan pumps which delivered the slurry to a triple layered headbox. The headbox pH was controlled to 7.0 by addition of a caustic to the thick stock before the fan pumps. The headbox deposited the slurry to a nip formed by a forming roll, an outer forming wire, and inner forming wire. The slurry was drained through the outer wire, which was a KT194-P design supplied by Asten Johnson (4399 Corporate Rd, Charleston, S.C. (843) 747-7800)), to aid with drainage, fiber support, and web formation. When the fabrics separated, the web followed the inner forming wire and was dried to approximately 25% solids using a series of 4 vacuum boxes and a steam box. The fabrics were running at 1450 meters/min. While this Example utilizes 4 vacuum boxes in the forming section, the system may utilize 1, 2, 3, 4, 5, 6, 7 or 8 vacuum boxes in the forming section.

The web was then transferred to a structured fabric with the aid of a vacuum box to facilitate fiber penetration into the structured fabric. The structured fabric was a Prolux 005 design supplied by Albany (216 Airport Drive Rochester, N.H. 03867 USA) and was a 5 shed design with a warp pick sequence of 1,3,5,2,4, a 17.8 by 11.1 yarn/cm Mesh and Count, a 0.35 mm warp monofilament, a 0.50 mm weft monofilament, a 1.02 mm caliper, with a 640 cfm and a knuckle surface that was sanded to impart 27% contact area with the Yankee dryer. The web was dried with the aid of two TAD hot air impingement drums to 85% consistency before transfer to the Yankee dryer.

The web was held in intimate contact with the Yankee surface using an adhesive coating chemistry. The Yankee was provided steam at 3.0 bar while the installed hot air impingement hood over the Yankee blew heated air up to 450 deg C. The web was creped at 97.5% consistency from the Yankee at 10% crepe using a ceramic blade at a pocket angle of 90 degrees. The web was cut into two of equal widths using a high pressure water stream at 10,000 psi and reeled into two equally sized parent rolls and transported to the converting process.

The vacuum system containing blowers (8) exhausted air into a header at a volumetric flow rate of 5000 m^3/min at 170 deg C. This header branches (100, 200) to duplicate air handling systems of both the first and second TAD drum. The exhaust air from the vacuum blowers was discharged to the atmosphere by closing damper (13) to 0% and opening damper (12 to 100% on the distributed control system (DCS) on each TAD drum air handling system.

The air handling system for the first TAD drum contains a supply fan, exhaust fan, and combustion fan. The combustion fan provides air to combust natural gas inside the combustion chamber (16). 1,200 normal cubic meters per hour of natural gas was combusted to heat the recirculaing air in the first TAD drum air handling system to 180 deg C. The supply fan (17) is capable of recirculating 11,600 m^3 of air per minute. This fan was running at 80% speed using a variable speed drive set by the operator in the DCS. This air is moved through the supply fan and impinged through the paper web and into the first TAD drum (20).

After passing through the paper web and into the TAD drum, the temperature of the air has been reduced to 104 deg C as it evaporates water from the web. An exhaust fan (23) ran at 72% speed, set in the DCS by the operator. This fan has maximum air handling capacity of 2500 m^3/min and is used to remove a portion of the humid air from the system. The remainder of the air was returned to the combustion chamber and recirculated through the process. Fresh make up air was provided by opening the fresh air damper (14) to 30% on the DCS.

The web then passed across a second TAD drum for further water removal from the paper web. The air handling system for the second TAD drum was identical to the first TAD drum.

As previously stated, the fast action damper (12) is open to 100% and fast acting damper (13) is closed to 0% on the DCS on the second TAD air handling system, same as on the first TAD air handling system.

The combustion chamber (16) utilized 275 normal cubic meters per hour of natural gas to heat the recirculaing air in the second TAD drum air handling system to 105 deg C. The supply fan (17) is capable of recirculating 11,600 m^3 of air per minute. This fan was run at 65% speed using a variable speed drive set by the operator in the DCS. This air is moved through the supply fan and impinged through the paper web and into the second TAD drum (not shown). After passing through the paper web and into TAD drum, the temperature of the air had been reduced to 86 deg C. An exhaust fan (23) ran at 60% speed set in the DCS by the operator. This fan has maximum air handling capacity of 2500 m^3/min and is used to remove a portion of the humid air from the system. The remainder of the air was returned to the combustion chamber and recirculated through the process. Fresh make up air was provided by opening the fresh air damper (13) to 15% on the DCS. The paper web left the second TAD drum at 85% consistency before being dried in the drying section to 97.5% consistency prior to being reeled onto a spool.

Next, the the vacuum system containing blowers (8) was utilized with the exhaust air from the vacuum blowers being discharged as makeup air to the first and second TAD air handling systems. This was accomplished by opening fast action damper (13) to 100% and by closing fast acting dampers (12) and (14) on each air handling system on the DCS. Then the pressure setpoint on the vacuum blower discharge air header was controlled to a setpoint of 0.1 kpa by using pressure controllers (11) to modulate fast action damper (12) on each air system. All remaining damper and fan speed setpoints remained unchanged with the target of 85% consistency leaving the second TAD drum remaining. The natural gas use dropped from 1200 to 900 normal cubic meters per hour in the first TAD combustion chamber. The natural gas use dropped from 275 to 50 normal cubic meters per hour in the second TAD combustion chamber.

Figure 2:
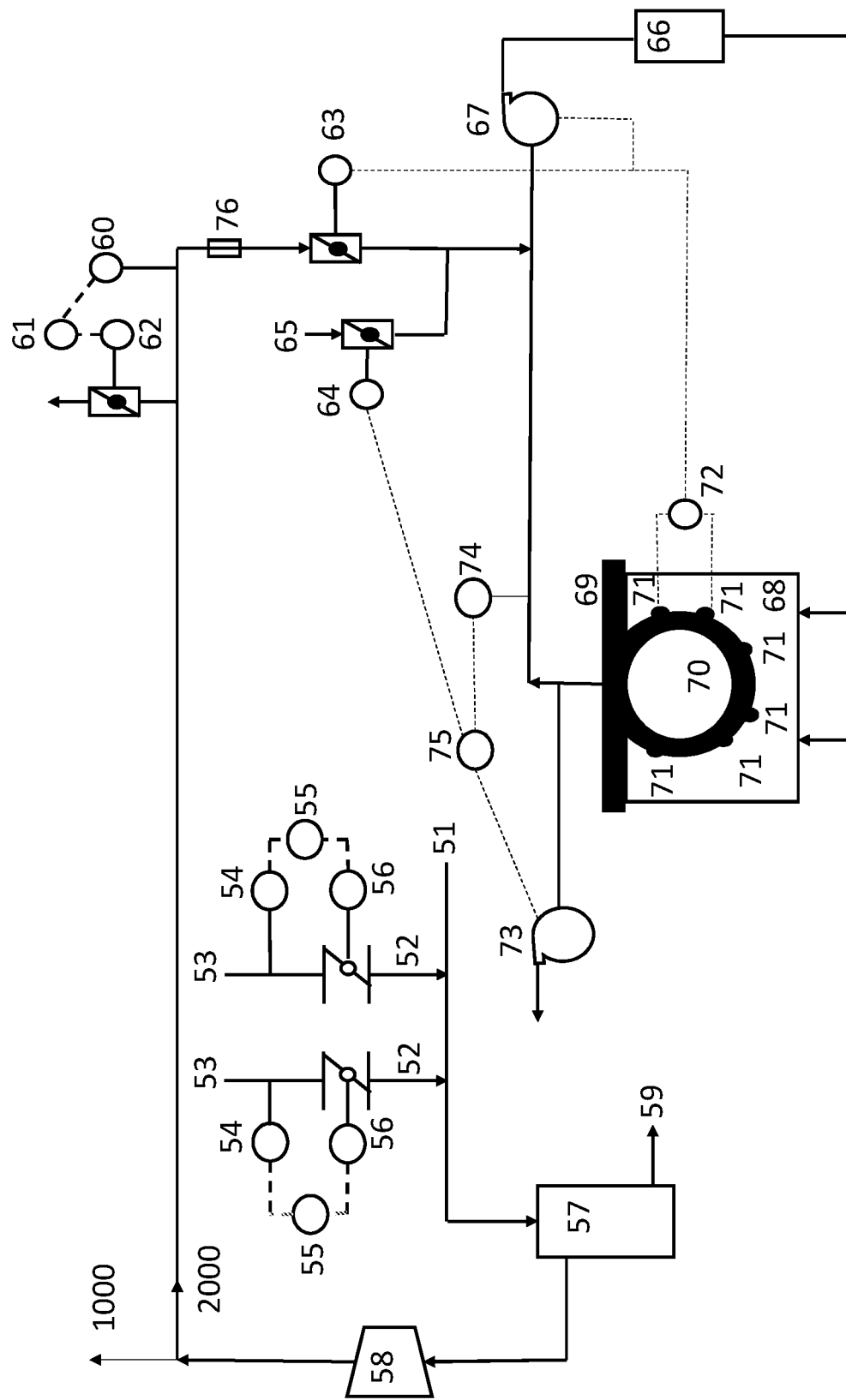
FIG. 2 is a schematic diagram of a control process according to another exemplary embodiment of the present invention.

FIG. 2 shows a control scheme according to another exemplary embodiment of the present invention for utilization of the exhaust air from paper machine centrifugal blower vacuum pumps into the paper machine Through Air Drying system. All the vacuum needs for the papermaking machine/process are centralized using vacuum pumps connected to a central or common piping header (51). From this header, branch piping (52) extends to the necessary points of application (53) and each branch can be controlled to a particular vacuum set-point using a control scheme which is typically a control loop using a pressure transmitter (54) and pressure indicating controller (55) to measure the vacuum in the branch and position a control valve (56) to maintain an operator inputted vacuum set-point for that branch. The vacuum header contains separators (57) to remove entrained water in the air stream between the vacuum source (vacuum blower 58) and application point. Water removed from the separator can be returned to the paper machine white water system (59).

The discharge air stream header leaving from the vacuum system can split into multiple branch lines (for example, two branch lines (1000), (2000) as shown in FIG. 2) to feed more than one hot air drying system. Although only branch line (2000) is shown in FIG. 2, it should be appreciated that second branch line (1000) will have the same controls and feed duplicate hot air drying systems. Each branch line to its hot air drying system may contain a pressure transmitter (60) and pressure indicating controller (61) to position a fast acting damper (62) or control valve (62) to maintain an operator inputted pressure set-point. This set-point will control the amount of pressure in the branch line by relieving pressure to atmosphere. The pressure set-point is recommended to be from 0.1 to 0.5 kpa in order to maintain slight pressure in the line as to not cause back pressure on the vacuum blower (58).

The discharge air stream from the vacuum system would then pass through a fast acting damper (63) which is the primary device to control the hot air system pressure along with the secondary device of the supply fan (67). These two devices are controlled by a pressure indicating controller (72). The pressure indicating controller receives pressure readings from pressure transmitters (71) installed along the perimeter of the hood on both the front and back side of the hood. These transmitters measure the pressure of air at the interface of the hood and drying cylinder along the perimeter where atmospheric air can be pulled through the gap that exists at the interface of the hood and drying cylinder. Typically, the pressure indicating controller will take the average reading of the pressure transmitters. The pressure set-point is operator inputted and is recommended at 0.1 kpa, which allows a slight amount of pressure and thus air to escape from the gap between the hood and the cylinder to prevent any cold air from atmosphere from entering the hot air system. This control loop is configured to maximize the position of the fast acting damper (63) while minimizing the speed of the supply fan (67) to maintain the pressure set point. This allows maximum utilization of the heat and kinetic energy that has already been expended into the vacuum discharge air stream before expending more energy at the supply fan. Limits to the range of motion to the fast acting damper (63) and supply fan speed (67) can be used in the control loop as well as how quickly these devices should adjust to maintain the pressure set-point.

The vacuum system discharge air stream then enters the through air dried hot air system upstream of the supply fan (67). The air is heated in the combustion chamber (66) before entering a hood (68) which extends over the paper web path (69) where the paper web is conveyed on a structuring fabric across a through air drying cylinder or drum (70).

After the hot air passes through the paper web and into the hollow cylinder, the air stream is recirculated back to the supply fan (67). As the air stream travels to the supply fan the humidity is measured by a humidity indicating transmitter (74) using a humidity indicating controller (75) to control the speed of the primary control device, exhaust fan (73) and the secondary control device, fresh air fast acting damper (64). The humidity set-point is operator inputted and recommended at 0.45 pounds of water per pound of air for maximum heat transfer and thus drying efficiency. This control loop is configured to maximize the speed of the exhaust fan 73) and minimize the position of the fast acting damper (64) to maintain the humidity set-point. This allows maximum utilization of the heat and kinetic energy that has already been expended into the hot air drying system before allowing cold atmospheric air (65) to enter through the fast acting damper, which requires more energy to heat than the energy required at the exhaust fan. Limits to the range of motion to the fast acting damper (64) and speed of the exhaust fan (73) can be used in the control loop as well as how quickly these devices should adjust to maintain the humidity set-point.

Fast acting dampers (63 and 64) are also used for purging to atmosphere during startup and shutdown conditions of the hot air heating system. The damper (63) on the discharge air stream would close for the purging and startup and shutdown conditions, while the second fast acting damper (64) would open to allow fresh air (65) into the air system to purge any remaining natural gas before firing the systems' gas burner (66). A weighted lift door (76) may be installed on the vacuum discharge air stream piping between the two fast acting dampers. The purpose of this device is to safely relieve pressure in the event of failure of the fast acting dampers to control or relieve pressure in the line. The weighted lift door will lift or open prior to potential failure of the piping due to over-pressurization. It will also close after relieving the excess pressure. The weighted lift door is located on the piping in a location where any discharge air is relieved to atmosphere away from any possible personnel.

Example 2

Referring back to the final setpoints achieved in Example 1, the control schemes outlined in Example 2 are followed. The pressure on the vacuum blower discharge air header was controlled to a setpoint of 0.1 kpa by using pressure controllers (61) to modulate fast action dampers (62) on each duplicate air system. Next, the temperature controls of both TAD 1 and TAD 2 air systems are placed into automatic control in the DCS. On TAD 1, the exhaust temperature setpoint of 104 deg C is input into the DCS and the temperature setpoint of the air leaving the combustion chamber (66) is automatically modulated to maintain the exhaust air temperature at 104 deg C. On TAD #2,the temperature setpoint of the air leaving the combustion chamber (66) is controlled to maintain a consistency setpoint in the paper web of 85% as measured on the web immediately prior to transfer to the yankee dryer. The device used to measure consistency measures the average consistency of the web across the entire width of the web. Next, the pressure indicating controller (72) on each TAD air handling system is placed into DCS control with a setpoint of 0.1 kpa which modulates the speed of the supply fans (67) and position of the fast acting damper (63) to maintain the pressure setpoint. Finally, the humidity controllers on each TAD air handling system are placed into DCS control where the exhaust fans (73) and fresh air fast acting dampers (64) are modulated to maintain the humidity ratio of the exhaust air stream at 0.45 lbs of water per lb of air. While the humidity ratio of 0.45 lbs of water per lb of air is used in this example, ratios of 0.30 to 0.60 lbs of water per pound of air may be utilized. With these controls now implemented, the following changes were observed.

On TAD 1 air handling system, fast acting damper (62) modulated between 0-5% open to maintain the vacuum discharge air header pressure at 0.1 kpa. The humidity controller increased the speed of the exhaust fan from 72% to 93% while keeping fast acting damper (64) closed. The pressure indicating controller (72) on TAD 1 increased the supply fan speed from 80% to 91% while keeping fast acting damper (63) at near 100% open. The natural gas flow decreased from 900 to 810 normal cubic meters per hour of natural gas. On TAD 2 air handling system, fast acting damper (62) modulated between 0-5% open to maintain the vacuum discharge air header pressure at 0.1 kpa. The humidity controller increased the speed of the exhaust fan from 60% to 73% while keeping fast acting damper (64) closed. The pressure indicating controller (72) on TAD #2increased the supply fan speed from 65% to 71% while keeping fast acting damper (63) at near 100% open. The natural gas air flow decreased from 50.7 to 23.5 normal cubic meters per hour of natural gas.

Now that the preferred embodiments of the present invention have been shown and described in detail, various modifications and improvements thereon will become readily available to those skilled in the art. Accordingly, the spirt and scope of the present invention is to be construed broadly and not limited by the foregoing specification.

We claim:

1. A papermaking process comprising:
    forming a wet paper web on a papermaking machine;
    pulling vacuum through the web at at least one point along the papermaking process to remove water from the web and thereby generate discharge air; and
    diverting at least a portion of the discharge air through a control loop to a hot air drying system disposed at a second point within the papermaking process to aid in drying the web, wherein the vacuum is generated by centrifugal blowers.

2. The process of claim 1, further comprising the step of controlling humidity of hot air within the hot air drying system.

3. The process of claim 2 further, wherein the step of controlling humidity
    comprises: detecting humidity of the hot air within the control loop; and
    controlling speed of an exhaust fan within the hot air drying system based on the detected humidity so as to adjust the humidity of the hot air to a predetermined level.

4. The process of claim 3, wherein the step of controlling humidity further comprises controlling position of a fresh air damper within the control loop based on the detected humidity.

5. The process of claim 1, further comprising the step of controlling pressure of the discharge air diverted to the hot air drying system.

6. The process of claim 5, wherein the step of controlling pressure comprises:
    detecting pressure of the discharge air; and
    controlling position of a damper within the control loop based on the detected pressure so as to adjust the pressure of the discharge air to a predetermined level.

7. The process of claim 1, further comprising the step of controlling pressure of hot air within the hot air drying system.

8. The process of claim 7, wherein the step of controlling pressure of hot air comprises:
    detecting pressure around a hot air impingement hood within the hot air drying system;
    controlling position of a vacuum exhaust damper within the control loop based on the detected pressure so as to adjust the pressure of hot air to a predetermined level.

9. The process of claim 8, wherein the step of controlling pressure of hot air further comprises controlling speed of a discharge air supply fan based on the detected pressure.

* * * * *